Dec. 31, 1968 J. B. STEWART 3,419,687

ENDLESS LOOP MESSAGE RECORDING APPARATUS WITH RESET AND INDICATING MEANS

Filed Oct. 7, 1964

WITNESSES:

INVENTOR
James B. Stewart
BY

3,419,687
ENDLESS LOOP MESSAGE RECORDING APPARATUS WITH RESET AND INDICATING MEANS

James B. Stewart, North Brunswick, N.J., assignor to Westinghouse Electric Corporation, East Pittsburgh, Pa., a corporation of Pennsylvania Filed Oct. 7, 1964, Ser. No. 402,197
9 Claims. (Cl. 179—100.2)

ABSTRACT OF THE DISCLOSURE

An audio message recording and retrieval system is disclosed which utilizes a continuous loop tape deck wherein a message of a predetermined length may be recorded on the continuous loop of recording tape. The system is operative to reset the loop of tape at the beginning of the previously recorded message and, with the presence of a message being indicated by, for example, the illumination of an indicating lamp. The playback of the recorded message is effected by activating the tape deck with the indicating lamp being deactivated on the instigation of the retrieval of the message.

The present invention relates to information recording and retrieval apparatus, and more particularly to message recording and playback apparatus utilizing continuous loop tape recorders.

Often it is desirable to record an audio message that will be available for playback a short time later. Conventional open ended tape recorders would require that the tape be rewound before the original message could be replayed. Also, if a continuous loop device were utilized, it would be necessary to sense the beginning of a message or to rewind the tape before the message could be played. In many household and business applications, apparatus which has the capability of recording relatively short audio messages, indicating the presence of such messages, resetting itself to the beginning of the message and then permitting a playback of the message immediately upon resetting would be a highly advantageous device.

It is therefore an object of the present invention to provide new and improved information recording and retrieval apparatus.

It is a further object of the present invention to provide message recording apparatus which permits the replay of a recorded message by automatically resetting to the beginning of the message after it has been recorded.

It is a further object of the present invention to provide new and improved audio message recording apparatus which permits the recording of a message, the indication of a recorded message, the automatic resetting to the beginning of the message and the retrieval of a recorded message.

Broadly, the present invention provides new and improved message recording apparatus utilizing a continuous loop tape deck in which after a message is recorded indication thereof is given. The tape is automatically cycled until the beginning of the original message is found; then playback of the original message can be effected, with the tape after playback recycling to a predetermined original point so that new messages may be recorded into the apparatus.

Figure 1:
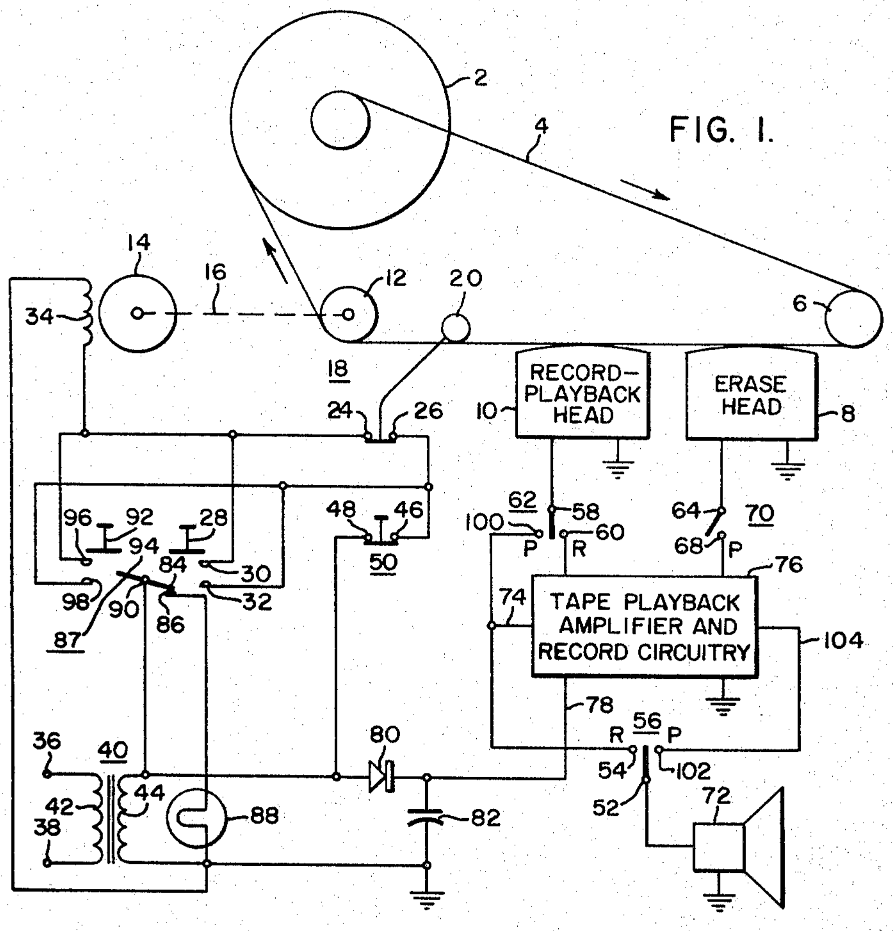
Figure 2:
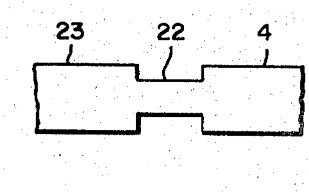

These and other objects and advantages of the present invention will become more apparent when considered in view of the following specification and drawings in which:

FIGURE 1 is a block-schematic diagram of the message recording apparatus of the present invention; and FIG. 2 is a face view of a portion of the continuous tape as utilized herein and showing the origin portion.

Referring to FIG. 1, a continuous loop tape deck is utilized as part of the present invention and includes a single spool of tape 2, with a continuous loop of tape 4, which may be of common magnetic recording variety, being drawn from the center of the spool 2. The tape 4 is passed over a pulley 6 and then traverses by an erasing head 8 and a record-playback head 10 to a capstan 12. The tape 4 is then rewound on the reel 2 from the outside. The capstan 12 is driven by a drive motor 14, which is connected by a mechanical linkage 16 to the capstan 12. In response to the actuation of the motor 14, the capstan 12 drives the tape 4 in the clockwise direction, as shown by the arrows, with the tape being pulled from the center of the reel 2 and rewound on the outside periphery of the reel 2.

The message apparatus as shown in FIG. 1 is assumed to have no messages recorded on the tape 4 and with the various switches in the operating states as shown. The tape 4 is positioned at a predetermined origin point with respect to the record-playback head 10 by providing a reset switch 18, which may comprise a microswitch. The switch 18 includes a trip lever 20 moving in a plane perpendicular to the plane of FIG. 1 for making and breaking contact. The trip lever 20 rides over the edge of the tape 4 and engages a cutout portion 22 of the tape 4 see FIG. 2. When the trip lever 20 engages the cutout portion 22, the switch 18 is in its open position. However, when the trip lever 20 engages the regular width portion 23 of the tape 4, the switch 18 will close to provide a circuit between the terminals 24 and 26. At the end of each cycle of rotation of the spool of the tape 4, the switch 18 will open in response to engaging the portion 22 of the tape 4. Thus, at the end of each cycle the tape will start at the same origin point. Of course, other methods of positioning the tape 4 with respect to the record-playback head 10 could be utilized as well as the apparatus indicated, such as by electrical means, or other indicia on the tape itself.

To record a message with the tape 4 in its origin position, a record button 28 is depressed to cause a set of contacts 30 and 32 to be brought into electrical contact which provides a short circuit across the switch 18. A completed electrical circuit is then provided to a winding 34 of the motor 14 to energize the motor. To supply the energy for operating the recording apparatus, a source of input voltage, not shown, is applied across a pair of input terminals 36 and 38, which may, for example, be 120 volts, 60 cycles. Across the terminals 36 and 38 is connected a power supply including transformer 40 having a primary winding 42. The transformer 40 has a secondary winding 44. With the contacts 30 and 32 being closed, an electrical circuit is thus provided through the winding 34 of the motor 14 from one end of the secondary winding 44, through the winding 34, the contacts 30–32, a pair of normally closed contacts 46–48 of a pause switch 50, which will be described later, to the other end of the secondary winding 44 of the power supply. The energization of the motor 14 will cause the capstan 12 to be rotated to drive the tape 4. Once the tape is rotated past its resetting portion 22, the resetting switch 18 will close to provide a closed circuit between the contacts 24–26 to complete an electrical circuit through the motor 14.

The closing of the record button 28 also causes the record process to be set up by closing a pair of contacts 52 and 54 of a transducer switch 56, a pair of contacts 58 and 60 of a record-playback head switch 62 and a pair of contacts 64 and 68 of an erase head switch 70. With the switches closed, as so described, audio information may then be applied to a transducer 72, which may comprise both a microphone and speaker assembly. However, of course, the microphone and speakers may be separate elements. The audio message is then applied to an input 74 of a tape playback amplifier and record circuitry 76, which may comprise such circuitry as is well known in the tape recorder art. The output to be recorded of the tape recorder amplifier and record circuitry 76 is then applied through the contacts 58 and 60 to the record head 10. An erase output is supplied through contacts 64 and 68 to the erase head 8.

The input audio information is then recorded onto the magnetic tape 4 by the well known process at a point subsequent to the origin point 22 of the tape 4. The erase head 8 acts to demagnetize or erase the tape 4 to remove any prior information on the tape before it passes over the record-playback head 10 to receive new information. A source of direct operating voltage is applied to the tape playback amplifier and record circuitry from an input 78, which is connected to a junction between a diode 80 and a filtering capacitor 82 that are connected across the secondary winding 44 of the power supply transformer 40.

When the record button 28 is depressed, a set of contacts 84 and 86 of a cantilever 87 is also closed to energize an indicating light 88 which has one end connected to the contact 86 and its other end to one end of the winding 44. The electrical circuit to the light 88 is completed through the contact 84, which is part of the cantilever member 87 having a center point 90, to the other end of the secondary winding 44. The depression of the record button 28 places the contacts 84 and 86 in engagement to illuminate continuously the indicating light 88 to show that a message has been recorded into the message apparatus.

It should be noted that the motor starting switch made up of contacts 30 and 32 remains closed only while the record button is held down, whereas the switch arrangement involving contacts 84, 86, 58, 60, 64, 68, 54 and 52 is of a bistable nature, these contacts remaining closed after the record button is depressed, until their condition is changed by pressing the play button, as will be described hereafter.

Audio information may be applied to the tape 4 over its entire length until the origin portion 22 is again reached showing the completion of one cycle of the tape 4. However, shorter messages may be recorded with the tape continuing regardlessly to recycle itself to the origin point 22, since the trip lever member 20 of the switch 18 will maintain the contacts 24 and 26 closed keeping the motor 14 energized. When the plunger 20 engages the portion 22 of the tape 4, the contacts 24 and 26 will be opened by the plunger 20 which will open the circuit to motor winding 34 and deenergize the motor 14. The recording apparatus will thus have recycled itself and will be positioned so that the beginning of the original message will be disposed on the tape so that it may immediately be played back as will now be described.

The illumination of the indicating light 88 will indicate to a person that a message has been recorded into the recording apparatus. To retrieve the recorded information, it is necessary only to depress a playback button 92. The depression of the button will engage a contact 94 of the cantilever member 87 to cause it to rotate about the center point 90 to disengage the contacts 84 and 86 which will deenergize the light 88. Also a pair of contacts 96 and 98 will be closed momentarily by the depression of the playback button 92. The contacts 96 and 98 provide a short circuit across the contacts 24 and 26 of the switch 18 which completes a circuit through the winding 34 of the motor 14; thus, energizing the motor 14. The tape 4, in turn, will be driven by the capstan 12 mechanically coupled by the linkage 16 to the motor 14. The tape will be driven so that the trip lever member 20 of the switch 18 will no longer engage the origin portion 22 but the regular portions 23 of the tape 4 so that the switch 18 will close providing an electrical circuit to the motor 14 after the play button is released similarly as described in the recording process.

The depression of the button 92 also sets up the playback operation of the tape deck. In the replay condition the record-playback head switch 62 has the contact 58 engaging another contact 100 thereof, while contacts 64 and 68 of the erase head switch 70 are opened and the contacts 52 and a contact 102 of the transducer switch 56 are closed to switch the transducer from the input of the recording circuitry to the output of the playback circuitry. Thus, the recorded message on the tape 4 is picked up by the record-playback head 10, now acting as a pick-up device, and applied through the contacts 58–100 to the input 74 of the tape playback amplifier and record circuitry 76. The amplified audio information is then applied from an output 104 of the tape recorder amplifier and record circuitry 76 to the contacts 102–52 of the transducer switch 56 to the transducer 72 whereby sound is produced.

All of the messages that have been previously recorded on the tape 4 during the previous record cycle will then be played back. After all the messages have been replayed, if some unused tape remains, the capstan 12 will continue to drive the tape 4, since the switch 18 will be in its closed position and the motor 14 will still be energized. The tape 4 will continue to rotate until the trip lever 20 engages the origin portion 22 of the tape 4. At this point, the switch 18 will open with the motor 14 being deenergized and the tape stopping at its origin reset position. The message recorder aparatus is now ready to receive new input audio information which may be effected by depressing the record button 28, with the procedure following as described above in reference to the record process.

The pause button 50 is connected in series between the power supply and the coil 34 of the motor 14. The switch 50 is normally closed having a pair of contacts 46 and 48. If it is desired to stop rotation of the tape 4 at any time during the play or record processes, it is only necessary to depress the pause button 50 which will disconnect the contacts 46 and 48 thereby opening the circuit to the winding 34, and thereby deenergizing the motor 14. The record or playback process can be reinstigated again by permitting the pause button to return to its original position to close the contacts 46 and 48. Since the contacts 24 and 26 of the switch 18 are connected during the record and playback cycles by the trip lever 20, the drive motor 14 will again be energized to continue the cycle until the origin portion 22 of the tape 4 is again reached to open the switch 18.

The particular switching arrangement shown herein is not intended to be all inclusive. Many other combinations and types of switches could be utilized to bring about the operation of the message recorder apparatus as described. The disclosed switching circuitry is intended only to be exemplary.

Although the present invention has been described with a certain degree of particularity, it should be understood that it has been given only by way of example and that numerous changes in the combination and arrangement of parts, elements and components may be made without departing from the scope and spirit of the present invention.

I claim as my invention:

1. An information recording and retrieval system comprising, a continuous loop tape deck, recording means for activating said tape deck to record information therein, reset means for deactivating said tape deck at the starting point of the previously recorded information after information has been recorded therein, indicating means responsive to said recording means to indicate the presence of recorded information, playback means for activating said tape deck to retrieve the previously recorded information and deactivating said indicating means upon the instigation of the retrieval of the previously recorded information, said reset means being operative to deactivate said tape deck at the starting point of the previously recorded information after the previously recorded information has been retrieved.

2. An information recording and retrieval system comprising, a continuous loop tape deck, recording means for activating said tape deck to record audio information therein, indicating means responsive to said recording means to indicate the presence of recorded information, playback means for activating said tape deck to retrieve said previously recorded information and deactivating said indicating means upon the instigation of the retrieval of previously recorded information, reset means operative to deactivate said tape deck at the starting point of the previously recorded information, and pause means for deactivating said tape deck at any point.

3. An audio information recording and retrieval system comprising, a continuous loop tape deck including a continuous loop of recording tape having a predetermined origin point thereon, recording means for activating said tape deck to record audio information on said continuous loop of tape, indicating means responsive to said recording means to indicate the presence of recorded information, playback means for activating said tape deck to retrieve said information and for deactivating said indicating means upon the instigation of the retrieval of the previously recorded information, and reset means operative to reset said tape at the predetermined point on said tape at the beginning of the previously recorded message after each of the recording and retrieval operations.

4. An audio information recording and retrieval system comprising, a continuous loop tape deck including a continuous loop of recording tape, recording means for activating said tape deck to record audio information on said continuus loop of tape, reset means for resetting the loop of tape at the beginning of the previously recorded information, indicating means responsive to said recording means to indicate the presence of recorded information, playback means for activating said tape deck to retrieve said information and for deactivating said indicating means upon the instigation of the retrieval of the previously recorded information, said reset means being operative to reset said tape at the beginning of the previously recorded message after it has been played back, and pause means for deactivating said tape deck at any point in the recording or retrieval operations.

5. An audio message recording and retrieval system comprising: a continuous loop tape deck including a continuous loop of recording tape capable of recording a message of a predetermined length; reset means responsive to the cycling of the loop to indicate the end of a cycle of the loop; recording means for activating said tape deck and for recording a message on said tape, after the recording of a message said tape deck being deactivated to stop said tape at the beginning of the previously recorded message in response to said reset means indicating the end of a cycle of said loop; indicating means responsive to said recording means to indicate the presence of a recorded message; and playback means for activating said tape deck and for retrieving said previously recorded message and deactivating said indicating means upon the instigation of the retrieval of said recorded message, said tape deck being deactivated in response to said reset means indicating the end of a cycle of said loop.

6. An audio message recording and retrieval system comprising: a continuous loop tape deck including a continuous loop of recording tape capable of recording a message of a predetermined length, said loop having reset means to indicate the end of a cycle of the loop; recording means for activating said tape deck for recording a message on said tape, after the recording of a message said tape deck being deactivated to stop said tape at the beginning of the previously recorded message in response to said reset means indicating the end of a cycle of said loop; indicating means responsive to said recording means to indicate the presence of a recorded message; and playback means for activating said tape deck for retrieving said recorded message and deactivating said indicating means upon the instigation of the retrieval of said recorded message, after the retrieval of the previously recorded message said tape deck being deactivated in response to said reset means indicating the end of a cycle of said loop.

7. An audio information recording and retrieval system comprising: a continuous loop tape deck including a continuous loop of magnetic recording tape having a predetermined starting point and capable of recording a message of a predetermined length; recording means for activating said tape deck for recording a message on said tape; indicating means responsive to said recording means to indicate the presence of a recorded message; playback means for activating said tape deck for retrieving said recorded message and deactivating said indicating means upon the instigation of the retrieval of said recorded message; reset means for deactivating said tape deck after each of the recording of a message and the playback of a message at the predetermined starting point indicating the end of a cycle of said loop; and pause means for deactivating said drive motor at any point in the recording or retrieval operations.

8. An audio information recording and retrieval system comprising: a continuous loop tape deck including a recording head, a continuous loop of magnetic recording tape capable of recording a message of a predetermined length, and a drive motor for driving said continuous loop by said recording head; recording means for activating said drive motor and said recording head for recording a message on said tape, reset means for deactivating said motor to stop said tape at the beginning of the previouslf recorded message at the end of a cycle of said loop; indicating means responsive to said recording means to indicate the presence of a recorded message; playback means for activating said drive motor and said recording head for retrieving said recorded message and deactivating said indicating means upon the instigation of the retrieval of said recorded message, said drive motor being deactivated in response to said reset means indicating the end of a cycle of said loop; and pause means for reactivating said drive motor at any point in the recording or retrieval operations.

9. An audio information recording and retrieval system comprising: a continuous loop tape deck including a record-playback head, an erase head, a continuous loop of magnetic recording tape capable of recording a message of a predetermined length, said loop having reset means to indicate the end of a cycle of the loop, and a drive motor for driving said continuous loop by said recording and erase heads; recording means for activating said drive motor, said erase head being operative to remove any previous messages and said record-playback head for recording a message on said tape, said motor being deactivated to stop said tape at the beginning of the previously recorded message in response to said reset means indicating the end of a cycle of said loop; indicating means responsive to said recording means to indicate the presence of a recorded message; playback means for activating said drive motor and said record-playback head for retrieving said recorded message and deactivating said indicating means upon the instigation of the retrieval of said recorded message, said drive motor being deactivated in response to said reset means indicating the end of a cycle of said loop; and pause means for deactivating said drive motor at any point in the recording or retrieval operations.

References Cited

UNITED STATES PATENTS

| | | | |
|---|---|---|---|
| Re. 23,112 | 5/1949 | Squire | 179—100.2 |
| 2,908,767 | 10/1959 | Fritzinger | 179—100.2 |

BERNARD KONICK, *Primary Examiner.*

J. R. GOUDEAU, *Assistant Examiner.*

U.S. Cl. X.R.

179—100.1